(12) United States Patent
Doering et al.

(10) Patent No.: US 8,150,605 B2
(45) Date of Patent: Apr. 3, 2012

(54) COORDINATION OF VARIABLE CAM TIMING AND VARIABLE DISPLACEMENT ENGINE SYSTEMS

(75) Inventors: Jeffrey Allen Doering, Canton, MI (US); John Eric Rollinger, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 661 days.

(21) Appl. No.: 12/372,481

(22) Filed: Feb. 17, 2009

(65) Prior Publication Data

US 2010/0211297 A1 Aug. 19, 2010

(51) Int. Cl.
- *F02D 43/00* (2006.01)
- *F01L 9/02* (2006.01)
- *F02D 13/02* (2006.01)

(52) U.S. Cl. .................. 701/112; 123/198 F; 123/90.15

(58) Field of Classification Search .................. 701/112, 701/101–105, 110, 114, 115; 123/90.12–90.17, 123/198 F, 478–481
See application file for complete search history.

(56) References Cited

U.S. PATENT DOCUMENTS

| | | | |
|---|---|---|---|
| 5,408,966 A | 4/1995 | Lipinski et al. | |
| 6,138,636 A | 10/2000 | Kohno et al. | |
| 6,158,212 A | 12/2000 | Tanaka | |
| 6,216,655 B1 | 4/2001 | Yoshiki et al. | |
| 6,390,039 B2 | 5/2002 | Fuwa | |
| 6,499,449 B2 | 12/2002 | Michelini et al. | |
| 6,588,385 B2 | 7/2003 | Fuwa | |
| 6,705,293 B2 | 3/2004 | Kawasaki | |
| 7,007,920 B2 | 3/2006 | Nishida et al. | |
| 7,014,167 B2 | 3/2006 | Fuwa | |
| 7,047,922 B2 | 5/2006 | Asada et al. | |
| 7,246,582 B2 | 7/2007 | Miyakoshi | |
| 7,835,848 B1 * | 11/2010 | Rollinger et al. ............. | 701/102 |

FOREIGN PATENT DOCUMENTS

| | | |
|---|---|---|
| EP | 1227229 A1 * | 7/2002 |
| GB | 2429074 | 2/2007 |

OTHER PUBLICATIONS

Rollinger, John Eric et al., "Coordination of Variable Cam Timing and Variable Displacement Engine Systems," U.S. Appl. No. 12/434,377, filed May 1, 2009, 30 pages.

* cited by examiner

*Primary Examiner* — Hieu T Vo
(74) *Attorney, Agent, or Firm* — Allan J. Lippa; Alleman Hall McCoy Russell & Tuttle LLP (57) ABSTRACT

Systems and methods are provided for operating an internal combustion engine including a variable cam timing (VCT) mechanism in cooperation with a plurality of deactivatable cylinders, each cylinder with a plurality of cylinder valves. One example method comprises, operating at a first cylinder valve timing before a transition of reactivating deactivated cylinders, and, before the transition, advancing cylinder valve timing from the first valve timing, where after the transition the cylinder valve timing remains at a second valve timing, the second valve timing advanced relative to the first valve timing.

19 Claims, 4 Drawing Sheets

COORDINATION OF VARIABLE CAM TIMING AND VARIABLE DISPLACEMENT ENGINE SYSTEMS

FIELD

The present application relates to methods for operating a variable displacement internal combustion engine (VDE) in coordination with variable cam timing (VCT).

BACKGROUND AND SUMMARY

Engines operating with a variable number of active or deactivated cylinders may be used to increase fuel economy, while optionally maintaining the overall exhaust mixture air-fuel ratio about stoichiometry. In some examples, half of an engine's cylinders may be disabled during selected conditions, where the selected conditions can be defined by parameters such as a speed/load window, as well as various other operating conditions including vehicle speed. A VDE control system may disable selected cylinders through the control of a plurality of cylinder valve deactivators that affect the operation of the cylinder's intake and exhaust valves. Variable displacement capabilities can be combined with, for example, variable cam timing (VCT), to further improve fuel economy and emissions performance of the vehicle.

However, a potential issue with variable displacement engines may occur when transitioning operation between the various displacement modes, for example, when transitioning from a non-VDE (or full-cylinder) mode to a VDE (or reduced cylinder) mode, and vice-versa. Specifically, the transitions can significantly affect the manifold pressure, engine airflow, engine power and engine torque output. This can be largely attributed to per-cylinder load changes correlated to the number of activated and deactivated cylinders. Similar engine operating parameters may also be affected by VCT. Thus, for an engine equipped with both VCT and variable displacement capabilities, the systems require coordination during VDE transitions to enable engine torque to meet the driver-demanded torque, while maintaining engine operating conditions within acceptable limits.

One example approach for coordinating VCT and VDE systems is shown by Michelini et al. in U.S. Pat. No. 6,499,449. In this example, VCT, throttle control, and spark retard are used to control manifold air pressure (MAP) during VDE transitions, to thereby maintain a constant driver-demanded torque output. Specifically, during a transition from a reduced cylinder mode to a full cylinder mode, cam timing is retarded to reduce the air charge and MAP provided to the cylinders upon reactivation.

However, the inventors herein have recognized several issues with such an approach, especially during transitions. As one example, the transitions significantly affect the cylinder-specific load of the cylinders by as much as, and possibly more than, 100%, due to per-cylinder load changes correlated to the number of activated and deactivated cylinders. As such, an acceptable cam timing for one mode may lead to excessive residuals in another mode, thus creating a potential for engine misfire during/after a transition. For example, as cylinders are reactivated, the per-cylinder load may decrease to a level where a cam timing acceptable in the partial cylinder mode may be unacceptable in the full cylinder mode, since cylinders can tolerate increased residuals at higher loads. Furthermore, if cam timing is adjusted to affect airflow in order to maintain engine torque, this may exacerbate the situation where residuals are increased even further beyond acceptable levels. For example, if cam timing is further retarded from an already retarded timing when activating cylinders, cylinder misfire may occur immediately after the transition, thus degrading performance. Similar engine operating parameters may also be affected by VCT. Thus, for an engine equipped with both VCT and variable displacement capabilities, the systems require coordination during VDE transitions to enable engine torque to meet the driver-demanded torque, while maintaining engine operating conditions within acceptable limits Thus, in one example, the above issues may be addressed by a method of operating an internal combustion engine including a variable cam timing (VCT) mechanism in cooperation with a plurality of deactivatable cylinders, each cylinder with a plurality of cylinder valves, the method comprising, operating at a first cylinder valve timing before a transition of reactivating deactivated cylinders, and before the transition, advancing cylinder valve timing from the first valve timing, where after the transition, the cylinder valve timing remains advanced at a second valve timing, the second valve timing advanced relative to the first valve timing.

In one particular example, a variable displacement engine is configured to operate with dual-equal variable cam timing. Herein, prior to cylinder reactivation, that is, during a transition from a reduced cylinder mode to a full cylinder mode, cam timing may be advanced (that is, retarded by a lesser amount) to enable the amount of residuals remaining in the cylinder to be substantially reduced. An acceptable VCT phase angle may be determined based on the engine load, manifold pressure, an estimated barometric pressure, borderline/knock limits, and other engine operating parameters. In this way, the cylinders may be prepared for reactivation so that acceptable levels of residuals are provided during and after the transition, while other parameters compensate for engine torque effects. As such, misfires and partial burns at the time of cylinder reactivation may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
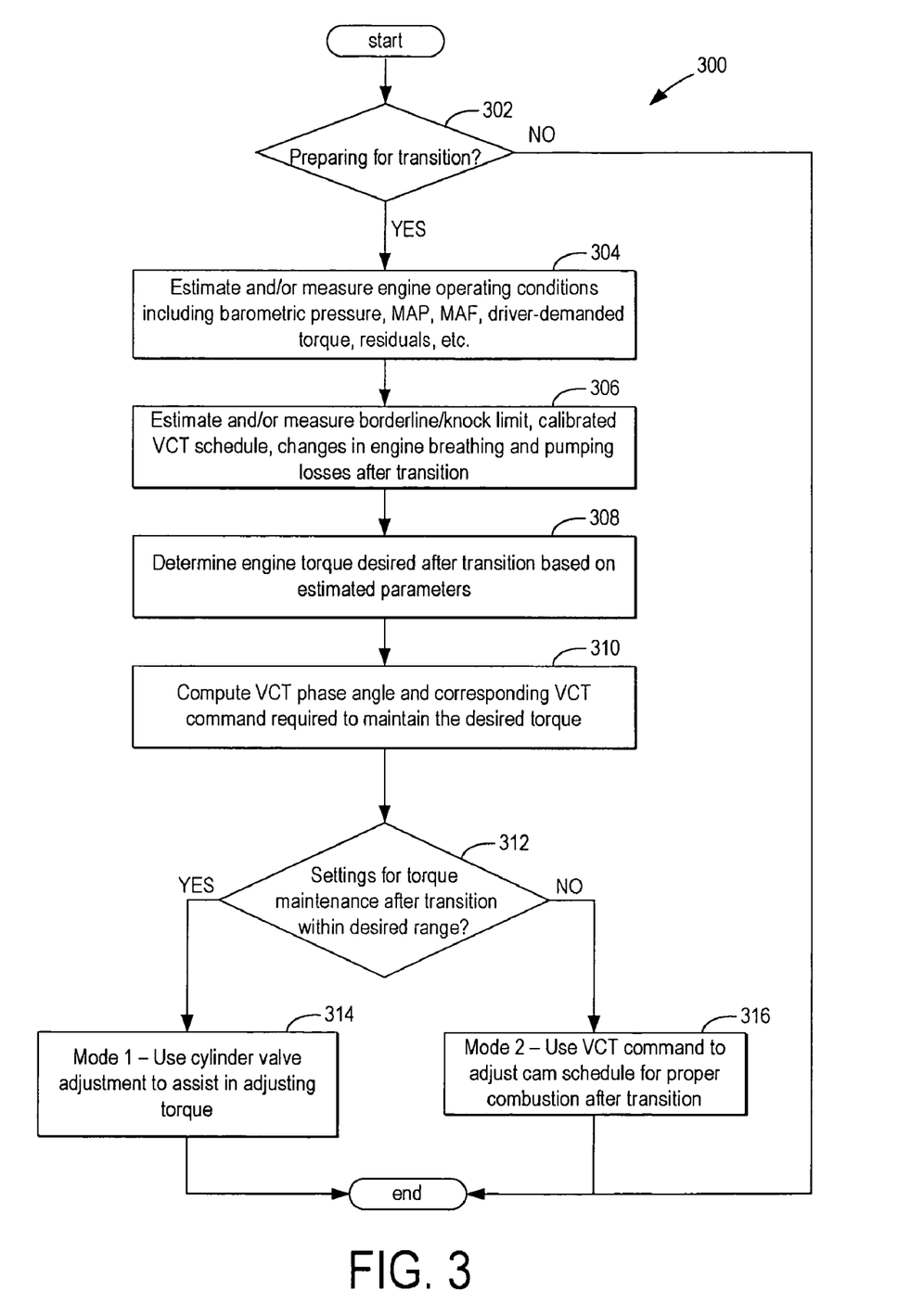
FIG. 3 shows a high level flow chart for transitioning operation of a variable displacement engine.
Figure 4:
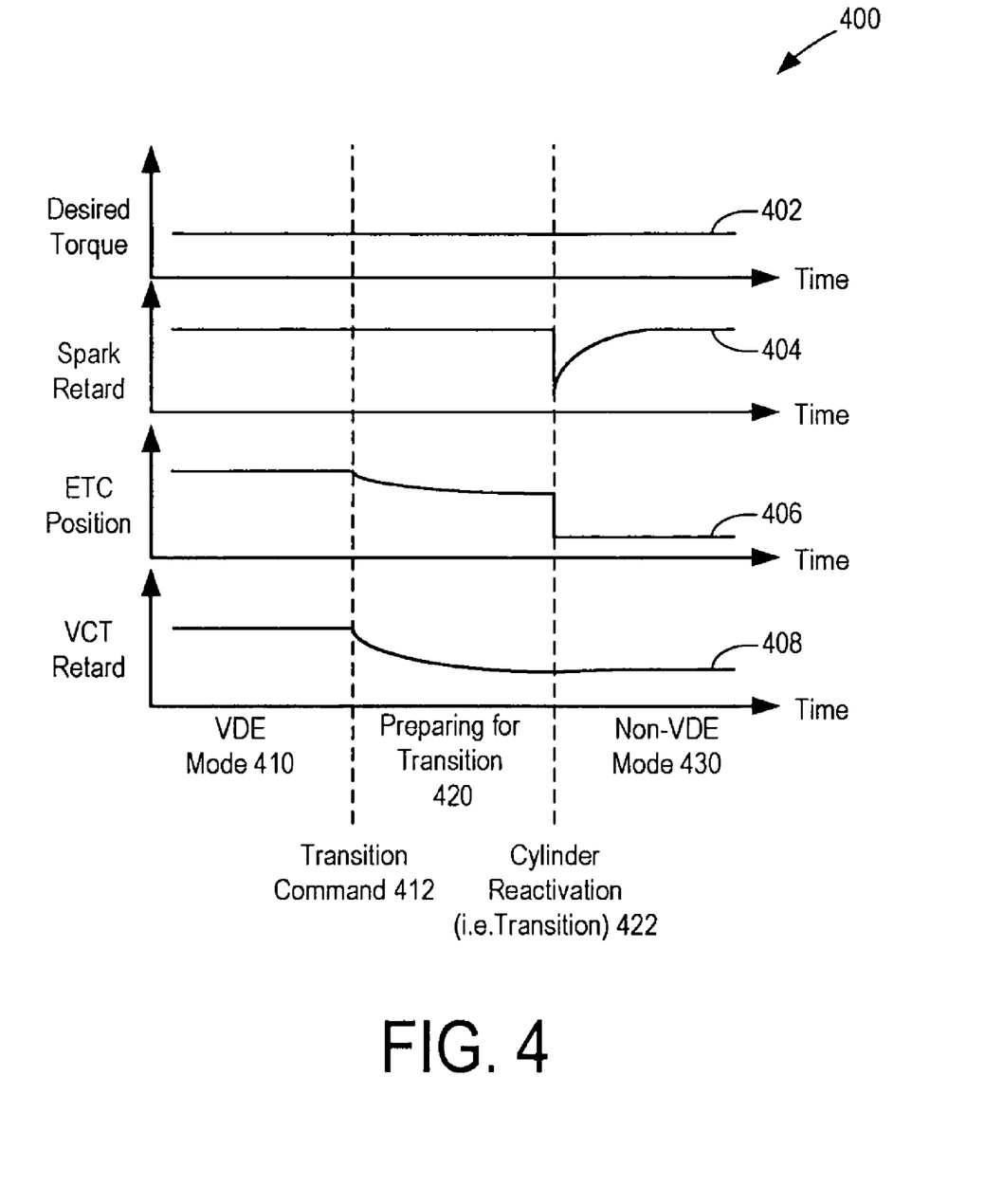
FIG. 4 is a timing diagram illustrating a transition in operation of a variable displacement engine from a VDE or reduced cylinder mode to a non-VDE or full cylinder mode according to the present disclosure.

The following description relates to systems and methods for coordinating variable displacement operation and variable cam timing in a variable displacement engine (VDE), in particular during transition between VDE and non-VDE modes of operation. As such, the variable displacement engine (such as the one illustrated in FIGS. 1-2) can switch between operation with all cylinders firing or half the cylinders firing by changing the operation of the intake and exhaust valves of selected cylinders. As shown in FIG. 3, an engine control system may be configured to adjust a cam timing (such as, an amount of cam retard) during and after a transition to provide the driver-demanded torque. The cam timing may be adjusted within a range based on, for example, combustion stability valve timing limits. The combustion stability limit may, in turn, be based on various engine output affecting parameters, such as those related to the generation of cylinder residuals, including, but not limited to, engine load, barometric pressure, air temperature, manifold pressure, changes in engine breathing and pumping losses during VDE transitions, and borderline/knock limits. In this way, as illustrated in FIG. 4, by adjusting the valve timing from a nominal valve timing based on combustion stability limits of valve timing following the VDE transition, cam timing and cylinder activation/deactivation events can be better coordinated to enable a smooth transition and reduce torque disturbances, misfires or partial burns.

Figure 1:
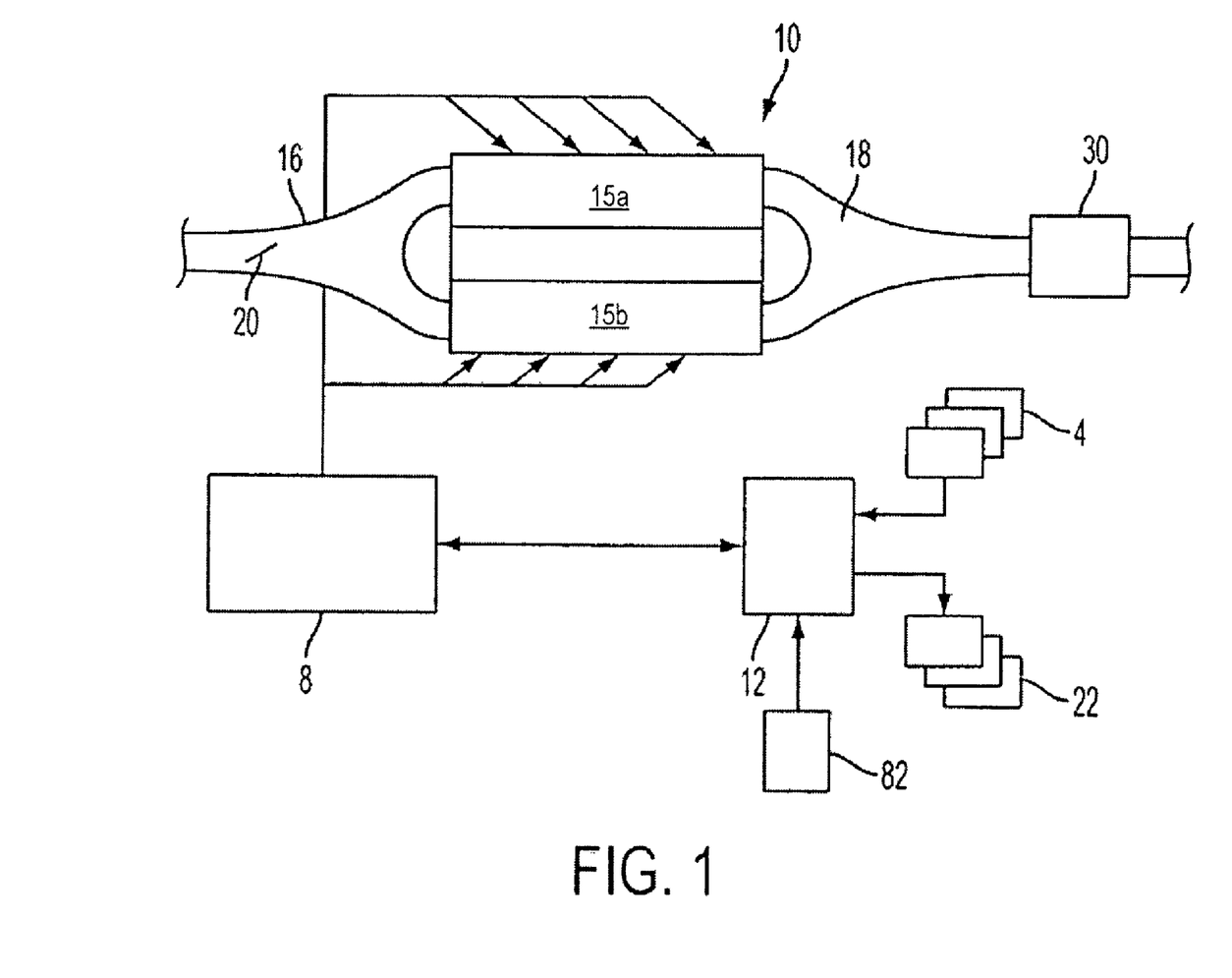
FIG. 1 shows an example engine and exhaust system layout.

FIG. 1 shows an example variable displacement engine (VDE) 10, in which four cylinders (e.g., two in each bank) may have cylinder valves held closed during one or more engine cycles. The cylinder valves may be deactivated via hydraulically actuated lifters, or via a cam profile switching (CPS) mechanism in which a cam lobe with no lift is used for deactivated valves. As depicted herein, engine 10 is a V8 engine with two cylinder banks 15a and 15b having an intake manifold 16 (with throttle 20) and an exhaust manifold 18 coupled to an emission control system 30 including one or more catalysts and air-fuel ratio sensors.

Engine 10 may operate on a plurality of substances, which may be delivered via fuel system 8. Engine 10 may be controlled at least partially by a control system including controller 12. Controller 12 may receive various signals from sensors 4 coupled to engine 10, and send control signals to various actuators 22 coupled to the engine and/or vehicle. Further, controller 12 may receive an indication of knock from knock sensor 82.

Figure 2:
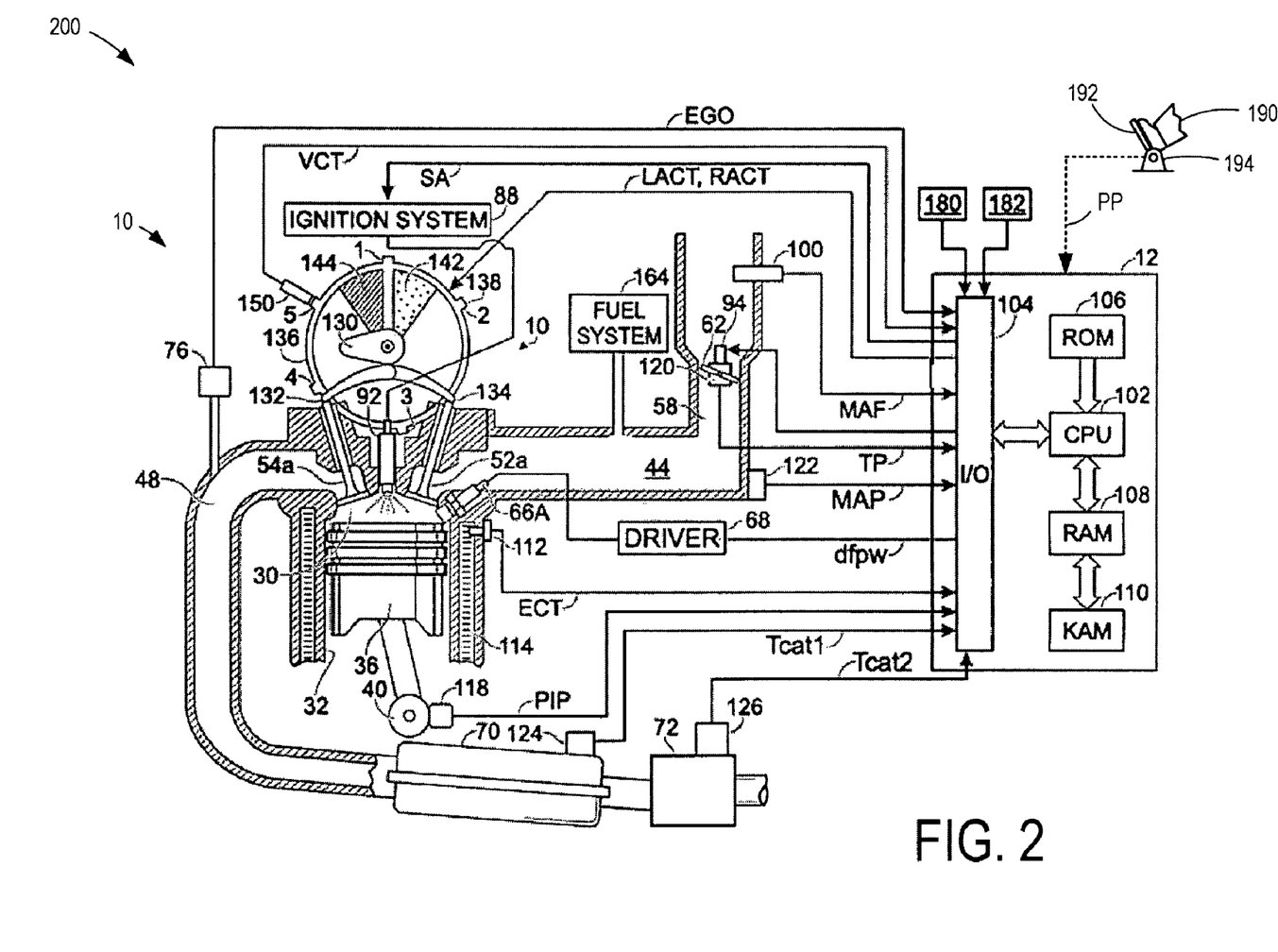
FIG. 2 shows a partial engine view.

FIG. 2 depicts an example embodiment 200 of a combustion chamber or cylinder of internal combustion engine 10. Engine 10 may receive control parameters from a control system including controller 12 and input from a vehicle operator 190 via an input device 192. In this example, input device 192 includes an accelerator pedal and a pedal position sensor 194 for generating a proportional pedal position signal PP. Cylinder (herein also "combustion chamber") 30 of engine 10 may include combustion chamber walls 32 with piston 36 positioned therein. In one particular example, piston 36 may include a recess or bowl (not shown) to help in forming stratified charges of air and fuel, if desired. However, in an alternative embodiment, a flat piston may be used. Piston 36 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10.

Cylinder 30 can receive intake air via intake air passages 44. Intake air passage 44 can communicate with other cylinders of engine 10 in addition to cylinder 30. In some embodiments, one or more of the intake passages may include a boosting device such as a turbocharger or a supercharger. A throttle 120 including a throttle plate 62 may be provided along an intake passage of the engine for varying the flow rate and/or pressure of intake air provided to the engine cylinders. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control. In an alternative embodiment (not shown), a bypass air passageway may be arranged in parallel with throttle plate 62 to control inducted airflow during idle speed control via an idle control by-pass valve positioned within the air passageway.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

Combustion chamber, or cylinder, 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Exhaust passage 48 can receive exhaust gases from other cylinders of engine 10 in addition to cylinder 30. Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. Emission control device 72 is shown positioned downstream of catalytic converter 70. Emission control device 72 may be a three-way catalyst, a NOx trap, various other emission control devices or combinations thereof.

In some embodiments, each cylinder of engine 10 may include a spark plug 92 for initiating combustion. Ignition system 88 can provide an ignition spark to combustion chamber 30 via spark plug 92 in response to spark advance signal SA from controller 12, under select operating modes. However, in some embodiments, spark plug 92 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, cylinder 14 is shown including a fuel injector 66A. Fuel injector 66A is shown coupled directly to cylinder 14 for injecting fuel directly therein in proportion to the pulse width of signal dfpw received from controller 12 via electronic driver 68. In this manner, fuel injector 66A provides what is known as direct injection (hereafter also referred to as "DI") of fuel into combustion cylinder 30. While FIG. 2 shows injector 66A as a side injector, it may also be located overhead of the piston, such as near the position of spark plug 92. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 66A from a high pressure fuel system (not shown) including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. In an alternative embodiment, injector 66A may be a port injector.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. Controller 12 can control the amount of fuel delivered by fuel injector 66A so that the homogeneous, stratified, or combined homogenous/stratified air/fuel mixture in chamber 30 can be selected to be at stoichiometry, a value rich of stoichiometry, or a value lean of stoichiometry.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 120; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 94; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In a one example, sensor 118, which is also used as an engine speed sensor, produces a predetermined number of equally spaced pulses every revolution of the crankshaft.

In this particular example, temperature Tcat1 of catalytic converter 70 is provided by temperature sensor 124 and temperature Tcat2 of emission control device 72 is provided by temperature sensor 126. In an alternate embodiment, temperature Tcat1 and temperature Tcat2 may be inferred from engine operation.

Continuing with FIG. 2, a variable camshaft timing system is shown. Specifically, camshaft 130 of engine 10 is shown communicating with rocker arms 132 and 134 for actuating intake valves 52a, 52b and exhaust valves 54a, 54b. Camshaft 130 is directly coupled to housing 136. Housing 136 forms a toothed wheel having a plurality of teeth 138. Housing 136 is hydraulically coupled to crankshaft 40 via a timing chain or belt (not shown). Therefore, housing 136 and camshaft 130 rotate at a speed substantially equivalent to the crankshaft. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

While this example shows a system in which the intake and exhaust valve timing are controlled concurrently, variable intake cam timing, variable exhaust cam timing, dual independent variable cam timing, dual equal variable cam timing, or fixed cam timing may be used. Further, variable valve lift may also be used. Further, camshaft profile switching may be used to provide different cam profiles under different operating conditions. Further still, the valvetrain may be roller finger follower, direct acting mechanical bucket, electromechanical, electrohydraulic, or other alternatives to rocker arms. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems.

Continuing with the variable cam timing system, teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification. In addition, controller 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

As described above, FIG. 2 merely shows one cylinder of a multi-cylinder engine, and that each cylinder has its own set of intake/exhaust valves, fuel injectors, spark plugs, etc.

Further, in the disclosed embodiments, an exhaust gas recirculation (EGR) system may be used to route a desired portion of exhaust gas from exhaust manifold 48 to intake manifold 44 via an EGR valve (not shown). Alternatively, or in addition, a portion of combustion gases may be retained in the combustion chambers by controlling exhaust valve timing, which may be referred to as residuals.

Now turning to FIG. 3, a routine 300 is described for coordinating the VCT capabilities of engine 10 (of FIGS. 1-2) with its variable displacement capabilities. Specifically, the routine allows cam timing to be adjusted (for example, retarded or advanced) from a nominal timing, during and after a transition, based on combustion stability limits of the timing following the transition. In view of per-cylinder load changes during reactivating/deactivating transitions, an engine control system may use routine 300 to determine whether an acceptable cam timing before the transition (for example a first cylinder valve timing) may lead to excessive residuals and potential misfires after the transition, and accordingly operate the engine at a second, more limited (for example, less retarded) cylinder valve timing. The engine may be further configured to compensate torque disturbances caused by the second cylinder valve timing using other methods, such as spark timing adjustments. In doing so, a smooth transition between different VDE operating modes can be achieved while avoiding potential misfires and partial burns following the transition.

At 302, it is determined if the engine is preparing for a VDE transition. That is, it is determined whether the engine has received a transition command and is preparing for an eventual transition from a VDE mode to a non-VDE mode, or vice versa. If no transition command and/or preparation for transition is determined, the routine may end. If a preparing for transition is determined, then at 304, engine operating conditions may be measured, estimated and/or inferred. The conditions assessed may include barometric pressure, a driver-demanded torque (for example, from a pedal-position sensor), manifold pressure (MAP), manifold air flow (MAF), an approximate amount of residuals left over in the cylinder (s) from the previous combustion cycle, engine temperature, air temperature, etc. As further elaborated below, these operating conditions may largely affect a VCT adjustment required to achieve a smooth transition between VDE operating modes. At 306, additional engine operating parameters that may enable further fine tuning of the VCT adjustment may be estimated and/or measured. These may include an estimate of borderline/knock limits, the calibrated VCT schedule, changes in engine breathing and pumping losses expected during and after the transition, etc.

At 308, based on the parameters estimated at 304 and 306, an engine torque desired while preparing for the transition, and to be maintained after the transition, may be determined. Accordingly, at 310, a VCT phase angle and a corresponding VCT command signal required to maintain the desired torque may be computed. The VCT command enables the VCT mechanism to be operated in accordance with the VCT phase angle. It will be appreciated that while computing the VCT phase angle, additional settings corresponding to throttle position, spark retard, etc., may also be determined. As such, all these settings may enable a desired airflow required for the desired engine torque to be maintained.

At 312, it is determined whether the chosen settings for cylinder valve timing, for torque maintenance after transition, are within a desired range. The desired range may be a combustion stability valve timing range. Thus, as one example, it may be determined whether the amount of VCT advance/retard computed, and the corresponding cylinder valve timing, is within a combustion stability valve timing limit. For example, the cam timing mechanism may be a dual equal variable cam timing system and the combustion stability valve timing limit may limit the cam timing retard of the system. In another example, it may be determined whether the VCT phase angle computed is within a maximum allowable range, such as within a physical limitation of phase angles. If the settings are within the desired range, that is, within the combustion stability valve timing limit, then at 314, the controller may operate the engine in control mode 1 wherein a first set of cylinder valve adjustments (for example, a first cylinder valve timing, valve lift, or valve lift and timing) may be employed to assist in adjusting the torque to the desired value and for maintaining the desired engine torque. As such, this may be in addition to adjusting a spark retard, a throttle position, etc.

In contrast, if the settings are not within the desired range at 312, that is, outside the combustion stability valve timing limit, then at 316, the controller may choose to operate the engine in control mode 2 wherein a second, more limited (for example, less retarded), set of cylinder valve adjustments (for example, a second, more limited cylinder valve timing, valve lift, or valve lift and timing) may be used to ensure that a complete burn and proper combustion may ensue in the cylinder(s) after the transition. For example, the first and second cylinder valve timings may both be retarded from a nominal valve timing. However, based on combustion stability limits following the transition (such as a cylinder reactivating transition), the second cylinder valve timing may be less retarded (or more advanced) than the first cylinder valve timing. Further herein, torque disturbances caused by the second, less retarded, cylinder valve timing may then be compensated using methods other than cam timing adjustments, for example using spark timing adjustments. In one example, while operating with the first cylinder valve timing, substantially no spark retard may be required to maintain the desired engine torque, while when operating with the second cylinder valve timing, a substantial amount of spark retard may be employed to compensate for torque disturbances arising due to the limited cylinder valve timing, and to maintain the desired torque.

As such, the allowable range of cylinder valve settings that are within combustion stability limits may be based on, and largely affected by, engine operating conditions including engine load, atmospheric (or barometric) pressure, extent of exhaust gas recirculation (EGR), temperature, such as intake air temperature and engine temperature, humidity, and the presence of internal residuals. In one example, in the presence of a larger amount of residuals, a narrower and more limited (e.g., less retarded) combustion stability valve timing range may be employed to reduce misfires and incomplete burns. In another example, in the presence of a greater extent of EGR, the narrower and more limited (e.g., less retarded) combustion stability valve timing range may be employed, given that more EGR may lead to more internal residuals. In yet another example, when operating the car at higher altitudes, a lower atmospheric pressure may be experienced, leading to a lower amount of residuals. Herein, the combustion stability valve timing employed may be a wider and less limited range (e.g., allowing greater retard). Further still, intake air temperature may also affect engine knock limits that may interplay with the allowable valve timings in different modes. As such, intake air temperature may affect the allowable valve timing range after a transition.

The combustion stability limits may be adjusted based on whether the VCT valve timing following the transition results in excessive residuals. During an exit from a VDE mode of operation, the in-cylinder aircharge may need to be rapidly decreased to avoid producing excessive engine torque and/or to reduce the need for excessive spark retard. As such, the in-cylinder aircharge following an exit from the VDE mode may sometimes be significantly lower (for example, up to 50% lower) than when in the VDE mode. The new lower aircharge may be achieved (for example, via throttle control) substantially faster than the VCT actuation. Thus, the VCT actuation may need to be pre-positioned just before the exit from VDE mode to a position that may satisfy combustion stability requirements both at the VDE mode's higher per-cylinder aircharge level and the post-VDE mode's lower per-cylinder aircharge level. As such, as the cylinder aircharge decreases, the engine's tolerance for residuals decreases.

The allowable range of cylinder valve settings may also take into consideration the volumetric efficiency of the engine. Specifically, it may be determined whether the volumetric efficiency of the engine at the new valve timing will be sufficient to achieve the required in-cylinder aircharge after the transition. In one example, during a transition into VDE, the VCT may be prepositioned based on the volumetric efficiency limits to allow the engine to get sufficient air to make sufficient torque in the VDE mode of operation. As such, when transitioning into VDE, a higher per cylinder aircharge may be required to achieve the same level of torque corresponding to a lower aircharge when all cylinders are operating (that is, before the transition). The higher cylinder aircharge may cause the borderline knock limit ignition timing to be less advanced. Thus, achieving a desired level of torque in VDE may be dependent on both the cylinder aircharge and the borderline limitations in the VDE mode. Accordingly, VCT may be adjusted while the engine is still operating on all cylinders (that is, in the non-VDE mode) so that following transition to the VDE mode, the engine is capable of inducting sufficient aircharge to meet the desired torque, while considering the interaction with borderline knock limits. These borderline knock limits may in turn be affected by intake air and engine temperatures, along with internal EGR (which may vary with cam timing) and external EGR, if an EGR valve is equipped on the engine.

In one example scenario, an engine's control system issues a first transition command to shift operation from a VDE (or reduced-cylinder) mode to a non-VDE (or full-cylinder) mode. That is, the first transition includes activating deactivated cylinders and the reactivated condition is a full cylinder activation condition. Following the command, the engine starts preparing for the first transition to a low load per-cylinder mode, prior to reactivating the designated cylinders. As such, it may be desired to maintain a constant engine torque output before, during, and after the transition between VDE operating modes. Since the number of firing cylinders will increase after the transition, the airflow and thus MAP to each of the firing cylinders may need to be decreased to maintain the constant torque output. That is, while preparing the cylinders, cylinder valve adjustments may be made such that the intake manifold may be filled to a lesser extent with air to achieve an aircharge and MAP that will provide the driver-demanded torque as soon as the designated cylinder(s) is reactivated. Accordingly, based on an estimation of engine operating parameters, the engine's throttle may adjust the MAP to a desired level. A look-up table may be used to derive a VCT phase angle based on the desired airflow, MAP and torque output. In one example, the engine may be prepared before the first transition to operate with a first cylinder valve timing, where that valve timing is achieved before the transition and then maintained after the transition. Furthermore, it may be determined based on the engine operating conditions that the selected first cylinder valve timing after the transition is within a combustion stability valve timing limit. Herein, the engine may be operated in control mode 1 and the selected (first) cylinder valve timing may enable the desired engine torque to be maintained before and after the (first) transition. As one example, the selected first cylinder valve timing may be retarded from a nominal valve timing but may be within the combustion stability valve timing limit. As such, the timing may also allow driver-demanded torque to be maintained during and after the transition. The engine torque output may be further tuned using spark timing adjustments, throttle adjustments, etc. In one example, substantially no spark retard may be used alongside the cam retard to maintain the desired engine torque.

In another example scenario, during a (second) transition including activating deactivated cylinders, it may be determined based on the engine operating conditions that the selected first cylinder valve timing after the transition is outside the combustion stability valve timing limit. For example, the selected cylinder valve timing may entail a large cam retard and the generation of a large amount of residuals. While operating cylinders may tolerate higher cam retard and higher residuals at high per-cylinder loads, after a reactivation transition, the per-cylinder load may drop such that the desired large cam retard may result in engine misfire due to increased residuals. Thus, the selected setting may lead to potential misfires immediately following the reactivation of the cylinders due to a shift to a low load per-cylinder. Herein, a controller may be configured to shift engine operation to control mode 2 and a second, more limited (e.g., less retarded and advanced relative to the limit), cylinder valve timing may be employed. As one example, the second cylinder valve timing may also be retarded from the nominal valve timing, but may be less retarded (or more advanced) than the first cylinder valve timing, and furthermore, may be within combustion stability limits. Engine torque disturbances caused by the advancing of cylinder valve timing may then be compensated for by methods other than cylinder valve timing adjustments. In one example, the torque disturbances may be compensated for with spark timing adjustments. It will be appreciated that when operating with the second, more limited, cylinder valve timing, a substantially greater amount of spark timing adjustment may be needed to maintain the desired engine torque before and after the transition. Thus, in one example, a substantially greater amount of spark retard may be used alongside the cam advance to maintain the desired engine torque. In doing so, potential issues such as misfire and knocking associated with more than desirable cam retard and more than desirable residuals during a low load per-cylinder mode of operation (or full cylinder mode) may be averted.

It will be appreciated that the example first and second transitions described above may each occur under similar speed and load conditions, but at different temperatures (such as different intake air temperatures). Alternatively, they may occur at different barometric pressures. Accordingly, the combustion stability valve timing limits and the amount of retard used to maintain engine torque may be dynamically adjusted.

In this way, by adjusting the cylinder valve timing during and after a transition between VDE modes of operation based on combustion stability limits, a smooth transition can be achieved and potential misfires and knock disturbances may be averted. By dynamically adjusting the combustion stability limits responsive to engine operating conditions, the VDE and VCT capabilities of an engine may be better coordinated to enable engine torque to meet the driver-demanded torque, while maintaining engine operating conditions within acceptable limits.

FIG. 4 shows a timing map 400 illustrating adjustments performed during and after preparation for a transition from a VDE to a non-VDE mode of operation, while operating the engine in control mode 2. A transition command 412 may be issued by the engine control system, commanding a transition from a VDE mode 410 (with a reduced number of cylinders activated) to a non-VDE mode 430 (with all cylinders activated). However, before cylinder reactivation 422, the engine may first enter a preparing for transition period 420. As shown by graph 402, it may be desired to maintain the driver-demanded torque at a constant level before, during, and after the transition between VDE operating modes. As such, when the designated cylinder or cylinders are reactivated, the desired aircharge and thus the MAP for the reactivated cylinders must decrease (since a larger number of cylinders will now be operating) to maintain constant engine torque output. However, sufficient air must be provided to allow residuals, leftover in the cylinder(s) from previous combustion cycles, to be substantially diluted. If not, they may cause misfires, partial burns, and degraded combustion following the transition. To attain the desired lower aircharge, the throttle opening may be gradually reduced during the preparing for transition period 420, as shown by graph 406. At the time of the actual transition, that is, at the time of cylinder reactivation 422, the throttle opening may be substantially reduced to attain the desired airflow. This allows the aircharge to be reduced during the transition without causing a sudden drop in engine torque, while allowing the aircharge and MAP levels to be immediately reduced to the desired level at the onset of cylinder reactivation.

As depicted, during the VDE mode 410 preceding the transition command 412, the engine may be operating with a first cylinder valve timing involving cam retard. The engine control system may determine that following the transition at 422, as the cylinders are reactivated, the per-cylinder load may decrease to a level where the first cylinder valve timing that was acceptable in the partial cylinder mode may be outside combustion stability limits in the full cylinder mode. That is, if cam timing is further retarded from the already retarded timing when reactivating the cylinders, the presence of residuals during the full cylinder mode (wherein there is a low load per-cylinder) may cause cylinder misfire to occur immediately after the transition, leading to degraded engine performance. Thus, in control mode 2, the engine may be operated with a second, less retarded, cylinder valve timing (that is, cam timing advanced relative to the first cylinder valve timing). Thus, the advanced cam timing may reflect a cam timing operating point with lower residuals while the previous relatively retarded cam timing may reflect a cam timing operating point with higher residuals. Additionally, or optionally, in consideration of volumetric efficiency limits, the advanced cam timing may reflect a cam timing operating point with higher volumetric efficiency while the previous relatively retarded cam timing may reflect a cam timing operating point with lower volumetric efficiency.

As shown by graph 408, to allow the airflow to gradually dilute out the residuals while attaining the desired MAP following cylinder reactivation, the VCT cam advance may be applied both during and following the preparation for transition period 420. A spark retard may be used in addition to the VCT cam advance following cylinder reactivation, as shown by graph 404, to further tune the desired torque and compensate for torque disturbances caused by the advancing of cam timing at 408. In this way, a VCT adjustment may be used while preparing the cylinders for a transition to increase the engine torque output when the MAP is lower than required to achieve the desired driver-demanded torque output.

Note that the example process flows included herein can be used with various valve system, engine system, and/or vehicle system configurations. These process flows may represent one or more of any number of processing strategies such as event-driven, interrupt-driven, multi-tasking, multi-threading, and the like that may be performed by the control system. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or operations may be repeatedly performed depending on the particular strategy being used. Further, the described acts may graphically represent code to be programmed into a computer readable storage medium of the control system.

It will be appreciated that the configurations and process flows disclosed herein are exemplary in nature, and that these specific embodiments are not to be considered in a limiting sense, because numerous variations are possible.

The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an engine having a plurality of cylinders, each cylinder with a plurality of cylinder valves;
a deactivation mechanism for deactivating at least one cylinder valve;
a variable cam timing mechanism for adjusting a timing of at least one cylinder valve;
a control system configured to,
operate the engine at a first cylinder valve timing before and after a first transition that changes the number of active cylinders to maintain a desired engine torque when the first cylinder valve timing after the transition is within a combustion stability valve timing limit; and
operate the engine at a second, less retarded, cylinder valve timing before and after a second transition when the first cylinder valve timing after the transition is outside the combustion stability valve timing limit.

2. The system of claim 1 wherein the control system is further configured to compensate torque disturbances caused by the second cylinder valve timing.

3. The system of claim 2 wherein torque disturbance compensation includes spark timing adjustments.

4. The system of claim 1 wherein the transition is a transition of reactivating deactivated cylinders, and the second cylinder valve timing is advanced relative to the first cylinder valve timing.

5. The system of claim 4 wherein the combustion stability valve timing limit limits cam timing retard of a dual equal variable cam timing system.

6. The system of claim 5 wherein the first and second transitions each occur under similar speed and load conditions, but at different temperatures.

7. The system of claim 5 wherein the first and second transitions each occur under similar speed and load conditions, but at different barometric pressures.

8. The system of claim 1 wherein the combustion stability valve timing limit is based on engine load.

9. The system of claim 1 wherein the combustion stability valve timing limit is based on atmospheric pressure.

10. A method of operating an internal combustion engine including a variable cam timing (VCT) mechanism in cooperation with a plurality of deactivatable cylinders, each cylinder with a plurality of cylinder valves, the method comprising,
operating at a first cylinder valve timing before a transition of reactivating deactivated cylinders; and
before the transition, advancing cylinder valve timing from the first valve timing, where after the transition the cylinder valve timing remains at a second valve timing, the second valve timing advanced relative to the first valve timing.

11. The method of claim 10 further comprising, compensating torque disturbances caused by the advancing of cylinder valve timing.

12. The method of claim 11 wherein compensating torque disturbances includes compensating with spark timing adjustments.

13. The method of claim 10 wherein the first valve timing and the second valve timing are retarded from a nominal valve timing, the second valve timing less retarded than the first valve timing, and where an amount of retard of the second valve timing is based on a combustion stability limit in the reactivated condition.

14. The method of claim 13 wherein the reactivated condition is a full cylinder activation condition.

15. A method of operating an internal combustion engine having a variable cam timing (VCT) mechanism in cooperation with a plurality of deactivatable cylinders, each cylinder with a plurality of cylinder valves, the method comprising, during a first transition, adjusting cylinder valve timing within a first range to maintain engine torque during and after the transition; and during a second transition, limiting the cylinder valve timing adjustment to be within a second, more limited range, the second range limited by at least a combustion stability valve timing limit after the transition, adjusting cylinder valve timing within the limits during and after the transition, and compensating torque disturbances caused by the limited valve timing adjustment.

16. The method of claim 15 wherein compensating torque disturbances includes compensating with spark timing adjustments.

17. The method of claim 15 wherein the first and second transitions each include activating deactivated cylinders.

18. The method of claim 15 wherein the first and second transitions occur under similar engine load, but at different intake air temperatures.

19. The method of claim 15 wherein the first and second transitions occur under similar engine speed and load, but at different barometric pressures.

* * * * *